United States Patent [19]

Wroblewski et al.

[11] Patent Number: 4,677,308

[45] Date of Patent: Jun. 30, 1987

[54] SWITCH STATUS MONITORING SYSTEM, SINGLE WIRE BUS, SMART SENSOR ARRANGEMENT THEREFOR

[75] Inventors: Thomas R. Wroblewski, Sterling Heights; Frederick O. R. Miesterfeld, Troy, both of Mich.

[73] Assignee: Chrysler Motors Corporation, Highland Park, Mich.

[21] Appl. No.: 944,715

[22] Filed: Dec. 22, 1986

[51] Int. Cl.⁴ .................. B60Q 1/00; B62D 45/00
[52] U.S. Cl. .................................. 307/10 R; 307/38; 340/52 F; 370/85
[58] Field of Search .............. 307/10 R, 38, 39, 9; 370/85; 340/52 F, 825.77, 825.63, 870.38, 870.39, 825.05, 825.08, 825.52

[56] References Cited

U.S. PATENT DOCUMENTS

| | | | |
|---|---|---|---|
| 4,232,231 | 11/1980 | Reed | 307/10 R |
| 4,463,341 | 7/1984 | Iwasaki | 307/10 R X |
| 4,574,266 | 3/1986 | Valentine | 340/52 F |
| 4,584,487 | 4/1986 | Hesse et al. | 307/10 R |
| 4,639,609 | 1/1987 | Floyd et al. | 307/10 R |

*Primary Examiner*—William M. Shoop, Jr.
*Assistant Examiner*—Sharon D. Logan
*Attorney, Agent, or Firm*—Wendell K. Fredericks

[57] ABSTRACT

Continuous status monitoring of a plurality of switches and smart sensors associated with the switches, wherein each sensor is connected to a separate single point on a single-wire bus is affected by a smart sensor multiplex arrangement. The multiplex arrangement employs a microcomputer and a driver and receiver circuit for developing a particular pulse train waveform, which is placed on the bus to provide power and control voltage signals to the plurality of smart sensors. The smart sensors contain circuits that respond to the waveform in a manner that causes each smart sensor to send current signals back over the single wire bus to the driver and receiver circuit and the microcomputer during designated repetitive and sequential time slots. The driver and receiver circuit receives, interprets and converts the current signals into voltage signals used by the microcomputer for establishing a history of the status of the bus, the sensors and the switches. The microcomputer supplies continuous and updated information to a display system indicative of the status of each sensor and its associated switch.

10 Claims, 8 Drawing Figures

///—Represents High Current Telling MCU 20 That The Sensor Is Present
\\\—Represents High Current Telling MCU 20 That The Switch Contact Is Closed

SWITCH STATUS MONITORING SYSTEM, SINGLE WIRE BUS, SMART SENSOR ARRANGEMENT THEREFOR

BACKGROUND OF THE INVENTION

1. Field of the Invention

This invention relates to multiplexing techniques for obtaining status of a plurality of switch devices disposed along and connected to a single wire bus and more particularly in a preferred embodiment to systems for generating visual displays at a remote instrument panel indicative of the status of a series of switch sensors individually connected to indicating and transducing type switches disposed throughout a motor vehicle, the switch sensors being separately multiplexed onto a single wire, power and signal bus routed near the switches.

2. Description of the Prior Art

Electronic status display systems in vehicles are rapidly becoming commonplace. These systems provide status and display data communications between intelligent or smart modules. Display information comes from many functional systems in the vehicle, such as suspension status, anti-lock status and diagnostics modes. Usually there is a sensor associated with each system. Inter-module communications allow for rapid and accurate diagnosis of functional system failures. Interactive running diagnostics often provides early warning to the driver to get to a repair station. Also, prior to putting the vehicle into traffic, the status of a variety of functional systems can be checked using the electronic status display systems.

In the prior art, an electrical load monitoring system for monitoring the operating condition of various automobile electrical devices is described in U.S. Pat. No. 4,574,266 issued on Mar. 4, 1986 to R. J. Valentine. There, a load switching circuit is coupled to a common voltage line via a drive line input. A load monitoring circuit located remotely from the load switching circuit is also connected to the drive line input of the load switching circuit. The load monitoring circuit provides a test current to the load switching circuit and thereafter detects a response from the switching circuit. The test current is monitored to see whether it raises the drive line to the test current's supply voltage or whether the test current is shunted to a common voltage line by means of a MOSFET detector. The microprocessor will then indicate a load failure if the load has opened. In such a system, a separate power line and a drive line are provided to connect the various load switching circuits that are to be monitored. This arrangement appears to reduce somewhat the number of interconnections between an electrical load and a load status indicator, even though a circuit remote from the load switching circuit is needed for generating a test current.

Still another arrangement for monitoring status of a variety of vehicle functions over a single bus are described in U.S. Pat. No. 4,584,487 which issued Apr. 22, 1986, to Hesse et al. There, component modules communicate with a transmitter/receiver (T/R) module during time intervals on the bus. The T/R module codes and decodes this data and transmits it over a data communications link to a number of distribution units each having the capability of controlling a number of vehicle devices and providing status information to a microprocessor. This arrangement provides both status and control information for a plurality of vehicle components. But, this arrangement requires power lines, as well as the common bus line.

BRIEF SUMMARY OF THE INVENTION

The present invention is concerned with a single wire bus smart switch sensor system for supplying power to each sensor and for sequentially sharing designated time intervals on the single wire bus with each powered sensor, in order to derive status information concerning the switch sensed by the sensor and diagnostic information regarding the operation of the sensor. A driver/receiver (D/R) unit controlled by a microcomputer (MCU) contains an offset square wave generator circuit which develops an offset square wave pulse train which is driven over the single wire bus to each smart sensor connected to the bus. The offset square wave train places several "states" of voltage level signals on the bus; each sensor simultaneously responds to the initial "states" of the voltage signal which provides power to turn on a toggle type up-counter contained in each sensor. Each counter provides bit data to an address detector in each sensor, the detector being preprogrammed to accept a particular array of digital bits from the counter, the array being indicative of an individualized address for that sensor. The addressed sensor has exclusive use of the bus during its particular time slot, determined by the counter value matching the pre-programmed value, for sending status information back to the D/R unit. Another state of the offset square wave train provides voltage level signals which enable circuits in the sensor to transmit over the single wire bus, current signals which are received, interpreted and then converted by the D/R unit into digital signals which are used by the microcomputer (MCU) to ascertain whether or not a sensor is present and then whether the switch connected to the sensor is open or closed. An input/output port of the MCU is used to transfer this sensor and switch status information to an instrument console of the vehicle where it is displayed visually on a display panel.

DETAILED DESCRIPTION OF A PREFERRED EMBODIMENT

Figure 1:
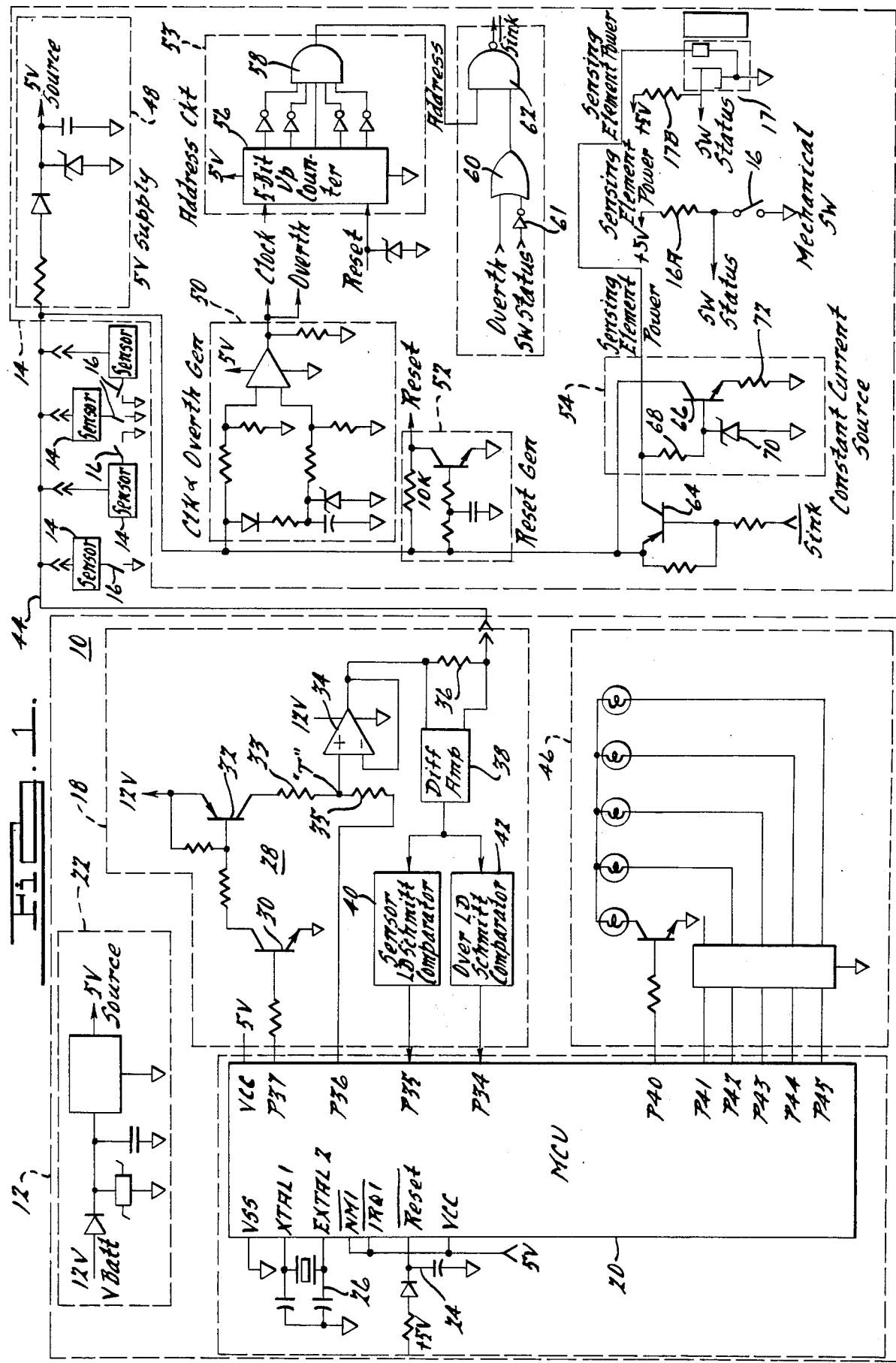
FIG. 1 is a partial block, partial schematic diagram of a single wire smart sensor system which sets the operating environment for the smart sensor according to the invention.
Figure 2:
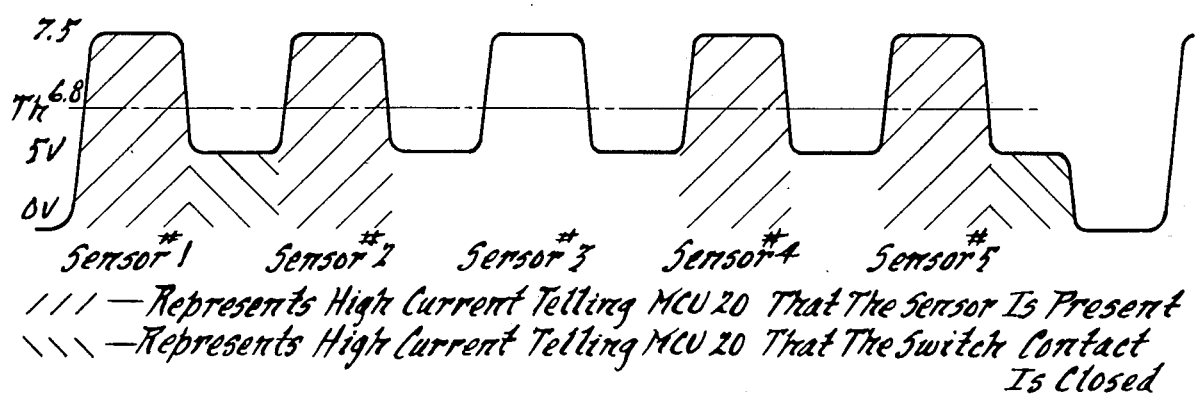
FIG. 2 is a waveform/address sequence diagram depicting the polling of a plurality of smart sensors sharing time on the single wire bus and the various voltage states of the offset square wave used by each sensor.
Figure 2A:
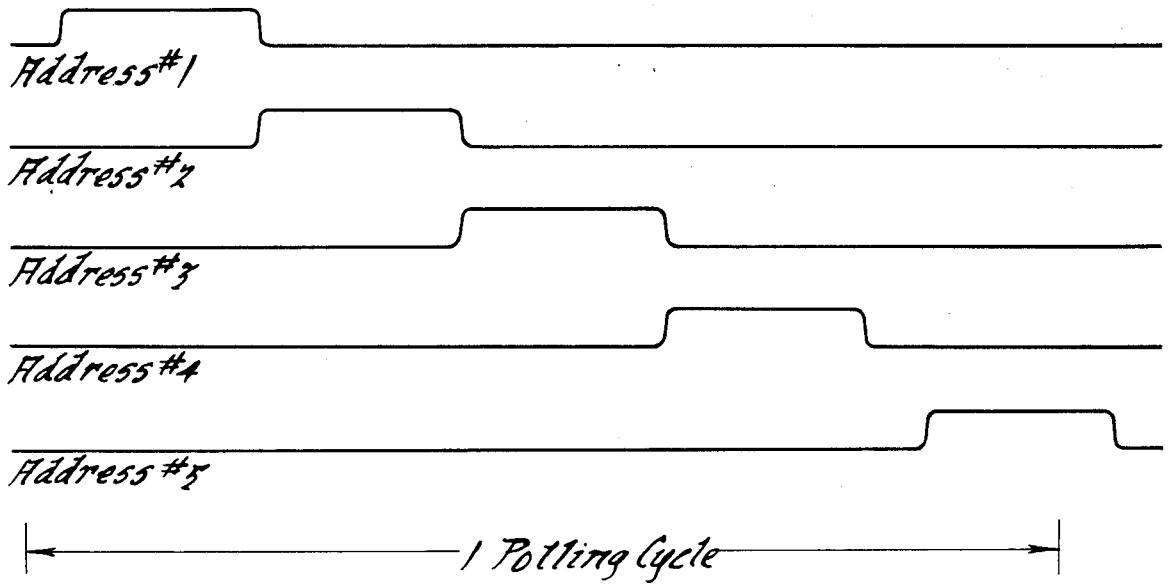
FIG. 2A is an address sequence diagram depicting the timing of the addressing of the sensors polled in FIG. 2 during one polling cycle.
Figure 3:
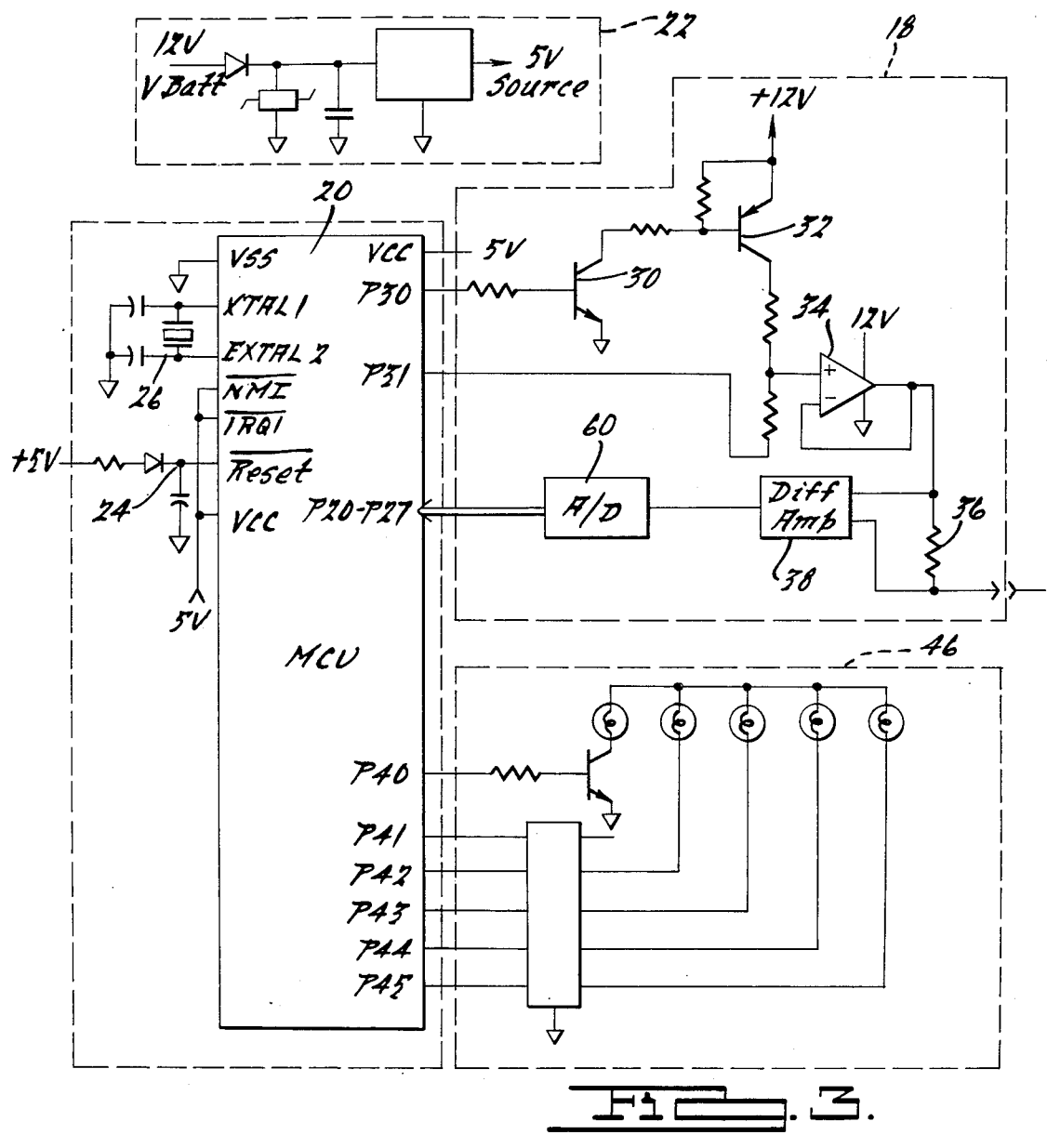
FIG. 3 is a schematic diagram of a driver/receiver unit when an A/D converter is used to provide status and diagnostic information to the MCU in place of the two Schmitt trigger comparators shown in FIG. 1.

Referring now to FIGS. 1 through 3, FIG. 1 is a partial block, partial schematic diagram of a preferred embodiment of a single wire smart switch sensor system 10. With +12 VDC battery supply voltage applied to the instrument compartment 12 of a motor vehicle incorporating a single wire smart switch sensor system 10, diagnostic information about each sensor 14—14 and switch status of each switch 16—16 in the system can be derived. Generally, the negative input of the battery voltage is grounded or at zero volt potential.

Driver/Receiver Unit

In order to generate power to the sensors 14—14 located at various remote locations of the motor vehicle, a drive receiver (D/R) unit 18 controlled by a microcomputer unit (MCU) 20 is used. Illustratively, both the D/R and MCU are located in the instrument compartment 12. Voltage from the 12 volt supply is applied to (D/R) unit 18 and a 5-volt regulator circuit 22 in the instrument compartment to establish a precise output voltage (e.g., 5 VDC ±2.5%). This regulated 5 VDC is applied to MCU 20 and D/R unit 18. Regulator 22 also provides, after an externally programmed delay, a 5 VDC signal for resetting MCU 20 during a power-on phase. The 5 VDC signal which is applied to $\overline{RESET}$ terminal of MCU 20 is a delayed signal allowing D/R 18 to become ready for MCU control. Capacitor 24 provides the external programmed delay function, holding the output voltage of regulator 22 LOW for a fraction of time (e.g., 20 ms) delaying start-up of MCU 20. After the delay, $\overline{RESET}$ goes HIGH and MCU 20 starts executing a factory installed program (the main software program) stored in ROM of MCU 20.

MCU 20, illustratively, is a single chip 8 bit unit such as a Motorola MC68701 microcomputer chip containing a CPU, on-chip clock, ROM, RAM, I/O and a timer. The on-chip clock is controlled by an external oscillator 26. Port 3 provides input/output lines P34–P37.

After initialization of registers and memories in MCU 20, and in accordance with the main program, the output port P37 goes HIGH to apply a base bias voltage to an NPN transistor 30 of an offset square wave generator circuit 28. Transistor 30 turns ON applying a base bias voltage to a PNP transistor 32. However, a pair of resistors 33 and 35 illustratively 10K ohms each, respectively, connected between the collector of transistor 32 and port P36 of MCU 20 form a voltage divider network which essentially divides the collector voltage in half at terminal "T". An offset square wave train is generated by a clock signal from port P36 of MCU 20 and is applied to one end of the voltage divider network causing collector current from transistor 32 to change in response to the clock signal, the clock signal swinging between 0 and 5 volts which causes terminal "T" to swing between 5.9 V and 8.75 V. Illustratively, a 1 KHz output pulse signal which goes between 5.9 VDC and 8.75 VDC from terminal "T" of the voltage divider is applied to a non-inverting input of a voltage follower circuit 34.

The square wave output of voltage follower circuit 34, which is equal to the input voltage is applied to a first terminal of resistor 36 which has a value; e.g., of about 5 ohms within D/R 18. A second terminal of resistor 36 is serially interfaced with a single wire power and signal bus 44. Power to the sensors is transferred over bus 44 in the form of the offset square wave train illustrated in FIG. 2. The maximum amplitude of this train is about 8.75 VDC; there is a threshold voltage level VTH of about 6.2 volts; and there is a base voltage amplitude which stays about 5 VDC above an OFF voltage of 0 VDC.

Transitions of the offset square wave from one voltage level to the next are referred to as "states". These translations and states will be referred to as the description proceeds.

The resistor 36 is also used to convert current signals to voltage signals mainly in response to changes in current levels due to a sensor accessing the bus. The voltage signals are applied to differential amplifier 38 which amplifies the voltages appearing across resistor 36 in response to current signals on the bus.

The output of amplifier 38 is applied to the input of two Schmitt trigger comparators 40 and 42, respectively. Comparator 40, a sensor load comparator, derives voltage level signals from amplifier 38 indicative of diagnostic information about the sensors, i.e., the sensors are present or are not working and status information concerning the switches (i.e., the switch is open or closed) connected to the sensors. Comparator 42 detects voltage level signals from the voltages from amplifier 38 that indicate abnormally high current on bus 44.

The output of the sensor load comparator 40 is applied to P35 of MCU 20 which utilizes this information and a look-up table stored in memory, to provide an output signal to a display network 46. Display network 46 provides, in the form of light indicators, a visual representation of the condition of the sensors and the status of the switches.

The output of comparator 42, an overload comparator, is applied to P34 of MCU 20 which utilizes this information to abort the operation of system 10 if an abnormal condition exists.

A modification to D/R 18 is shown in FIG. 3 where a conventional analog-to-digital (A/D) converter 60 replaces both Schmitt trigger comparators 40 and 42. The choice of using an A/D converter rather than the comparators occurs when the number of sensors on the bus is not known apriori; i.e., the number of sensors is not really known before examination of analysis. When there are no sensors loading the bus using the A/D converter 60, the quiescent voltage due to the current load may be read and stored by MCU 20. This provides a ratiometric technique for determining sensor loads, overcurrent loads and no load conditions.

Single Wire Bus

As mentioned supra, bus 44, a bi-directional single wire communication assembly, is used for transmitting voltage signal and power from D/R 18 to the sensors and current signals from the sensors back to D/R 18. Illustratively, this single wire may be a flexible length of wire of a suitable gauge covered with an insulated material at all points except for sensor interface regions. Bus 44 should be reasonably flexible in order to be routed in the vicinity of all the switches to be monitored.

Status Switches

The types of switches which may be monitored fall in two broad categories, namely, mechanically actuated switches, e.g., single pole, single throw switch, and electrically powered switch such as Hall-effect and optically actuated switches. The mechanical switch is illustrated as switch 16 in FIG. 1 while the electrically powered switch is illustrated as switch 17. These switches function independent of MCU 20. In this embodiment, the Hall-Effect transistor is a Texas Instruments, Incorporated of Dallas, Tex., Model No. TL 172C.

Sensor Circuit

A separate sensor 14 is provided for each switch 16 or 17; each sensor is separately connected to bus 44 by a single pin interface. The chassis or other convenient ground point is used by the sensors as the voltage reference (0 VDC).

Figure 2B:
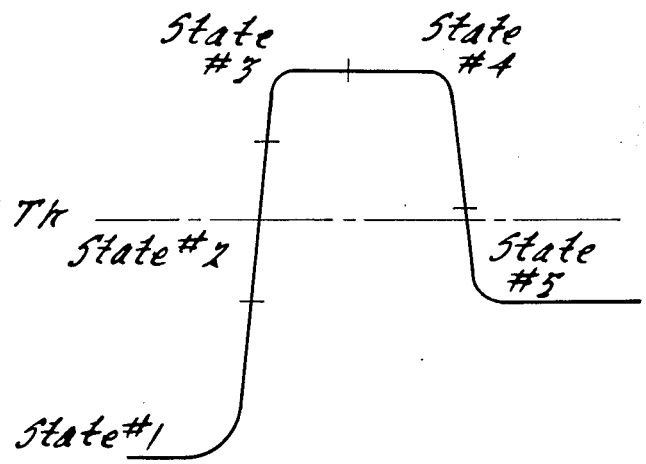
FIG. 2B is a voltage diagram depicting the various "states" of the waveform of FIG. 2.

To provide power to the sensors, the offset square wave train is placed on bus 44. State "1" of the pulse train, i.e., the transition of the leading edge of the initial pulse that goes from 1 volt to just below 5 volts places the sensors in an OFF condition as shown in FIG. 2 and FIG. 2B.

State "2" of the pulse train occurs when the amplitude of the leading edge goes above the 5 volt level. In state "2", illustratively, 5.5 VDC is applied simultaneously to all the networks within all the sensors on the bus; namely, a 5 VDC supply network 48, a clock and overthreshold signal generator 50, a reset signal generator 52, an address circuit 53 and a constant current source 54. The 5 VDC supply network provides logic power to all of the logic networks in the sensors. The reset signal generator in each sensor provides a reset signal to a conventional 5-bit up-counter 56 in the address circuit 53 which resets all of the counter outputs to LOW or to a binary code number representation of the number zero. The $\overline{\text{RESET}}$ signal occurs when the voltage on the bus exceeds, e.g., 5 volts. When the bus voltage exceeds 5 volts, the 5 VDC supply network 48 turns on, then the $\overline{\text{RESET}}$ circuit 52 is cut off after a delay caused by a delay circuit within the $\overline{\text{RESET}}$ circuit 52.

State "3" of the pulse train occurs when the leading edge of the pulse train passes through the threshold voltage level of about 6.8 volts. At such time, the clock and overthreshold signal generator 50 is activated. A clock signal from generator 50 is applied to counter 56 in each sensor. A binary number code output from counter 56 in each sensor is applied to an address detector 58 pre-programmed to accept a single binary number code from the counter. Each address detector 58 has its unique binary number code which is the address of the sensor in which the detector 58 resides. The address detectors 58 are generally pre-programmed to permit addressing sequentially each sensor during each polling cycle segment of the pulse train. MCU 20 polls each sensor once during a polling cycle. Thus, MCU 20 provides repetitive sequential time slots for each sensor to time share on the single wire bus 44.

Coincidental with the generation of the clock pulse by clock and overthreshold generator 50, the overthreshold signal is generated and applied to one input terminal of an OR gate 60 enabling it. The output of gate 60 is applied to one input of a two-input NAND gate 62, while the output of the enabled address detector 58 is applied to the other input, thus enabling gate 62 and providing an output "$\overline{\text{SINK}}$" signal. The $\overline{\text{SINK}}$ signal provides a base sink current that turns on a PNP transistor 64. The offset voltage from the bus is applied to the emitter of transistor 64 and a collector of NPN transistor 66 in the constant current source 54. The base of the transistor 66 wired via a resistor 68 to the collector of transistor 64 is held; e.g., at a constant 4.7 VDC by a zener diode 70 when transistor 64 is turned ON. Thus, the collector current output of transistor 66 is dictated almost entirely by the zener voltage at the base of transistor 66 and by an emitter resistor 72. Hence, the collector current is substantially independent of the value of the collector load resistance and, thus, acts as a constant current source. The magnitude of the constant current is between 25 and 50 ma and is controlled primarily by resistor 72.

A sensing element, associated with switch 16, a resistor 16A, if a mechanical switch is used, or resistor 17B, if an electrical drive switch 17 is used, is connected between 5 volts and an inverted input terminal of OR gate 60 to provide switch status information to sensor 14. If the switch 16 or 17 associated with the sensing element is closed, the $\overline{\text{SINK}}$ signal will be generated at the output of AND gate 62. If the switch is open, the AND gate 62 would be disabled removing the "$\overline{\text{SINK}}$" signal. Hence, the constant current source 54 would be cut off. This action occurs during a state when the voltage levels on the bus are such that the OVERTH signal is LOW.

The constant current source 54 and the sensing element resistor 16A or 17B are employed during states "4" and "5" of the offset square wave pulse train.

State "4" occurs during the span of the pulse during which the leading edge, the crest and the training edge of the positive half cycle are all above the threshold voltage level. During this state "4," the conditions for operation of the constant current source are present; high current normally is flowing on the bus. The bus current flows through resistor 36 in D/R 18 of FIG. 1 at the instrument compartment, and is converted to voltage signals by differential amplifier 38 as mentioned supra.

The comparators 40 and 42 determine the character of the current and apply voltage signal indications to MCU as to the states of the sensors and the position of the switch contacts. If the constant current source is ON during state "4" and the high currents from the generator is flowing through the bus, then MCU 20 will know that the addressed sensor is present. If the high current from constant current source 54 is not on bus 44, then MCU 20 will know that the sensor is either not present (i.e., not connected to the bus) or it is not working properly.

State "5" occurs during the trailing edge of the positive half cycle of a cycle of the square waves when the voltage level drops below the threshold voltage. Then, if the constant current source 54 is supplying high current to bus 44, the D/R 18 circuit, will provide a proper voltage signal to MCU 20 indicating that the switch contact is CLOSED. If, the constant current source 54 is not providing the high current, the D/R 18 circuits will provide a proper voltage signal to MCU 20 indicating that the switch contact is open.

The next pulse of the offset voltage square wave pulse train is used to obtain the sensor and switch contact status of the next sensor connected to the bus that is pre-programmed to be sensed. Each succeeding pulse is used to monitor sequentially each sensor connected to bus 44. Only the first and last address locations on the bus use the state "1" portion of the pulse, i.e., when the system 10 is turned On and then OFF during the leading edge of the initial pulse and the trailing edge of the final pulse during each pulse train segment.

Operation Of The System

The operation of system 10 will now be discussed. Assuming the status of switch 16 of FIG. 1 is desired, sensor 14 is interfaced to bus 44 at one point and the terminal of the wiper arm of switch 16 is connected to the switch status end of resistor 16A. Switch 16 may be used to detect illustratively when an oil port in an engine is filled. Because system 10 is connected in parallel with the primary power system of the motor vehicle (not shown), 12 VDC is applied to the 5-volt voltage regulator 22 and the D/R circuit 18 in the instrument compartment (not shown) of the vehicle. The 5 VDC source voltage from V-regulator 22 is applied to MCU 20, but the $\overline{\text{RESET}}$ terminal is held LOW for approximately 20 ms to allow the D/R 18 to become fully operable.

Figure 4A:
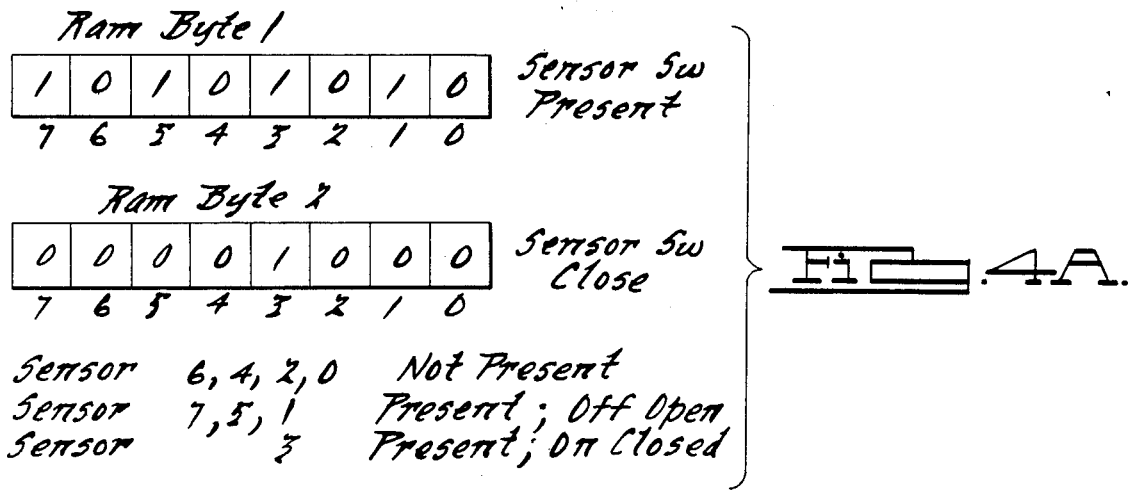
FIG. 4A depicts a RAM BYTE 1 and RAM BYTE 2 of the MCU.
Figure 4:
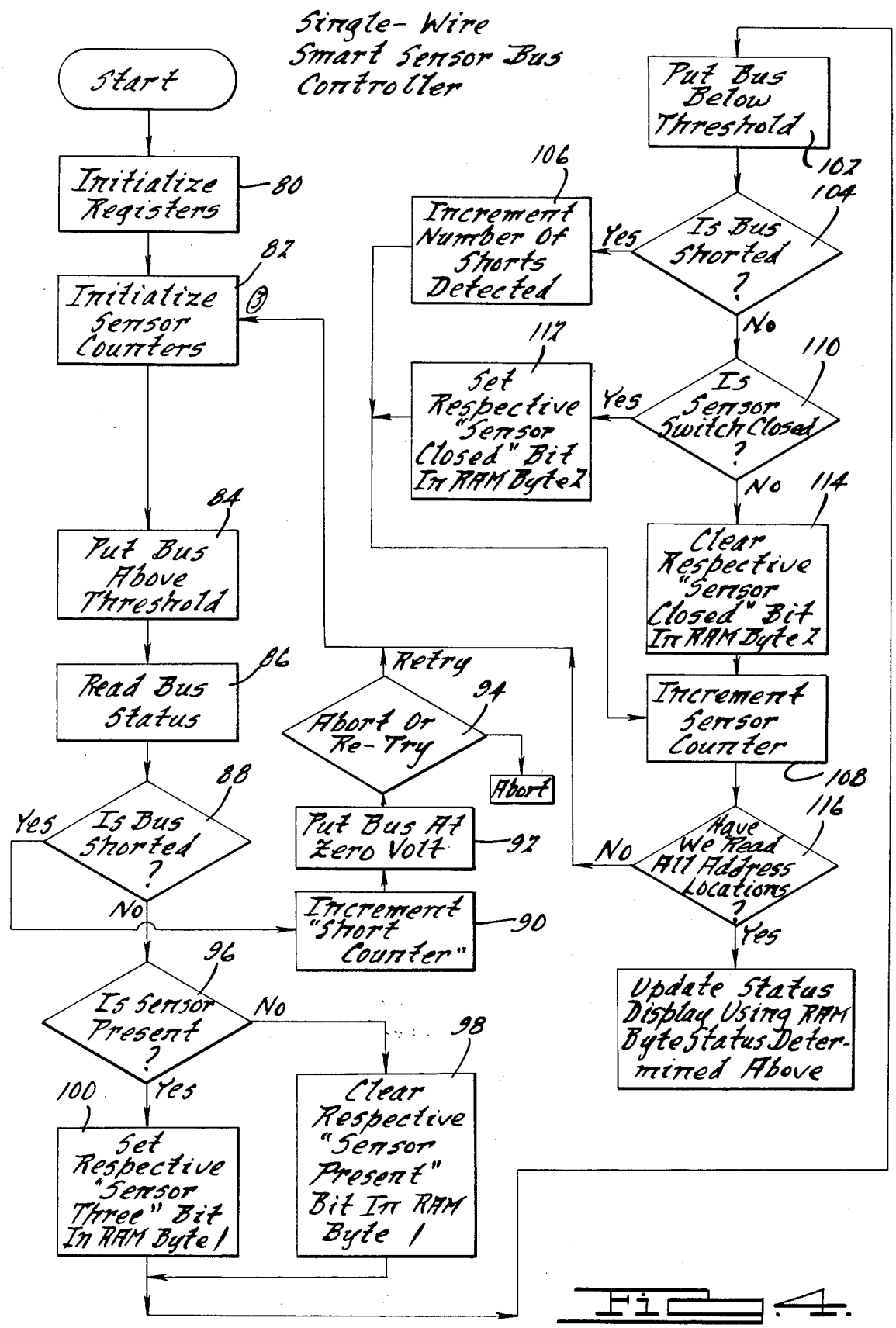
FIG. 4 is a flowchart indicating the program routine used by the MCU of this invention to accumulate sensor diagnostic and switch status data when Schmitt trigger comparators are used to supply the data.

To relate the operation of MCU with D/R 18, reference is now made to FIG. 4, a flowchart of the program executed by MCU 20 is shown. After the 20 ms delay, as in block 80, MCU 20 executed a small start-up program which sets all CPU registers with correct values and clears all information in the computer memory to zero before accepting information from D/R 18. This is called initializing the registers.

Then MCU 20 initializes its internal sensor counters in RAM as indicated in block 82. As can be appreciated by those skilled in the art, MCU 20 operates in the MHz range while system 10 operates around 1 KHz. Hence, MCU 20 can perform many functions before system 10 reacts.

Hence, as in instruction block 84, MCU 20 is instructed to write to port 3 in a manner providing to the offset square wave generator circuit 28 of FIG. 1 within D/R 18, a HIGH signal at P37 and a clock signal at P36 in order to initiate and generate the 1 KHz offset square wave form of FIG. 2 and putting the waveform over the threshold. During state "2" of the waveform, 5-volt supply network 48 in sensor 14 supplies power to the sensor circuits. As the voltage rises from 0 volt up to 5 volts, the $\overline{\text{RESET}}$ circuit 52 provides a HIGH reset signal which is used to $\overline{\text{RESET}}$ counter 56. After a predetermined delay, the reset signal goes LOW and becomes inactive. When the waveform crosses over the threshold (TH), clock and overthreshold generator 50 in each sensor connected to bus 44 generates a clock signal and an overthreshold signal. The overthreshold signal is inactive at this time, but, however, the clock signal is used to clock the count in counter 56 up one binary sequence in each sensor 14. The output of counter 56 is applied to the address detectors 58 in each sensor; and, the one sensor will be addressed in which the detector is programmed to become enabled by a one binary count from its associated counter. Once the counter is addressed, the overthreshold signal becomes active. The active overthreshold signal, along with an address signal from detector 58, are applied to AND gate 62 to develop the $\overline{\text{SINK}}$ signal. The $\overline{\text{SINK}}$ signal turns ON transistor 64 which then turns ON the constant current source 54 causing current signals to exist on the bus.

To ensure that noise spikes or other interfering signals are not present, when MCU 20 reads the status of the bus, illustratively, MCU 20 employing an integrating procedure, samples each half cycle of the voltage signal from bus 44 ten times. If, e.g., seven out of ten samples are true, then the reading is considered valid and the current on the bus is HIGH. If three of the ten samples are true, the current on the bus is LOW, then the three samples are considered invalid or are false signals caused by interfering signals. If, between three and seven samples are true, the state of the bus is unknown, then MCU 20 disregards its findings and then looks at a different set of sampled current data.

MCU 20 is now instructed in block 86 to read the status of the bus. MCU 20 looks at port 3 again and reads the incoming voltage signals at P35 and P34. P35 receives from D/R 18 voltage signals indicative of sensor load status; while P34 receives voltage signals indicative of overloading of the bus.

MCU 20, after reading the voltage information at port 3, determines if the bus is shorted as shown in decision box 88. If bus 44 is shorted, MCU 20 is instructed to increment its internal "SHORT" counter one count as in instructional block 90. Then, MCU 20 is instructed to put the bus at zero volt as in block 92. Then, depending upon the count in the "SHORT COUNTER", MCU 20 determines whether to abort the program as in block 94 or to retry by going back to instruction block 82 and starting the program over from that point. If bus 44 is not shorted, MCU 20 then checks sensor status during state "4" of the waveform.

As in decision block 96, MCU 20 checks to determine whether a sensor is present. If not, MCU 20 then is instructed as in block 98 to clear the respective "SENSOR PRESENT" bit in RAM BYTE 1 as depicted in FIG. 4A. If the sensor is present, MCU 20 is instructed in block 100 to set the RESPECTIVE "sensor PRESENT" bit in RAM BYTE 1.

Following adjustments to RAM BYTE 1, MCU 20 is instructed in block 102 to put bus 44 below the threshold voltage. This occurs during a negative half cycle of the pulse train or during state "5".

With bus 44 below the threshold, MCU 20 determines as in decision block 104 whether the bus is shorted. If the bus is shorted, MCU 20 increments the "SHORT COUNTER" and essentially stops the bus operation and then it is instructed as in block 108 to increment the sensor counter enabling the program to begin all over again looking at location number one. If the bus is not shorted, MCU determines as in decision block 110 whether the switch being monitored by the sensor is OPEN or CLOSED. If the switch is closed, MCU 20 is instructed in block 112 to set the respective "SENSOR CLOSED" bit in RAM BYTE 2 as depicted in FIG. 4A. If the switch is not closed, MCU 20 instructed as in block 114 to clear the respective "SENSOR CLOSED" bit in RAM BYTE 2.

Following adjusting RAM BYTE 2, MCU 20 is instructed as in block 108 to increment its internal sensor counter.

After the sensor counter is incremented, MCU 20 then determines as in decision block 116 whether all sensor address locations have been read. If not, the program instructs MCU 20 to go back to block 82 and start the sequence of reading the status of the bus above and below threshold for high currents and sensor load activity. If all the address locations had been read, then MCU 20 as in instruction block 118 updates the status display 46 using the RAM BYTE status data determined supra.

Figure 5:
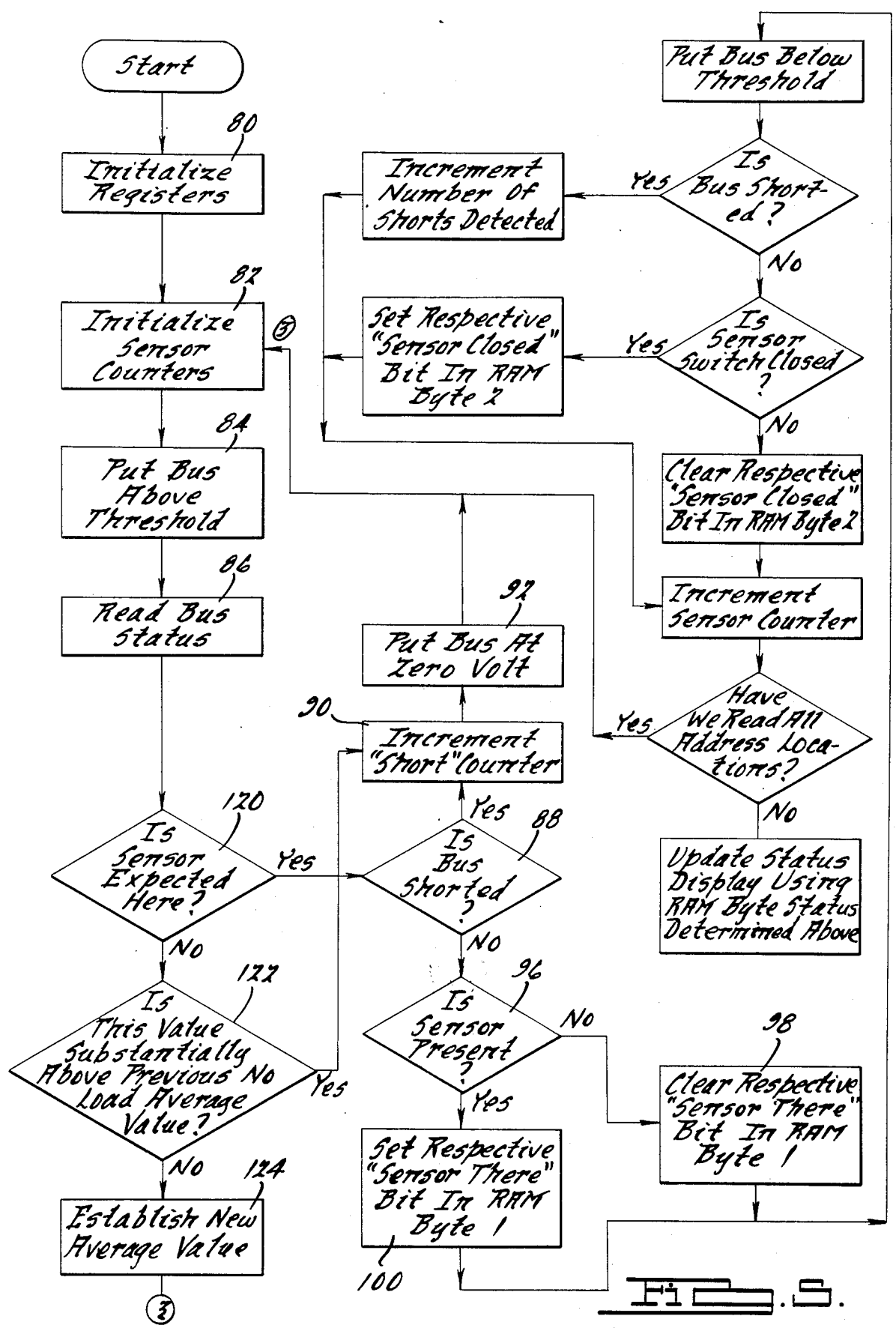
FIG. 5 is a flowchart indicating the program routine used by the MCU when an A/D converter is used to supply data.

Referring now to FIG. 5 which shows a flowchart of a program used when the A/D converter circuit of FIG. 3 is used instead of the Schmitt trigger comparators. The flowchart of FIG. 5 is identical to the flowchart of FIG. 4, except for the addition of decision blocks 120 and 122 and instruction block 124.

As in decision block 120, MCU 20 determines whether a sensor is expected. This decision must be made if there is knowledge beforehand of a sensor being present at a chosen address. If so, MCU goes normally to decision block 88 and proceeds as it did previously. If not, MCU 20 determines, as in decision block 122, whether the voltage levels on the bus are substantially above previous no load average values. If so, it is assumed that the bus is shorted and MCU 20 increments its "short" counter as in block 90, and the program resets the bus and starts over. If not, MCU 20 is instructed to establish a new average value as in block 124 and then return to block 82 in order to read another sensor.

To summarize the type status information system 10 presents, refer now to FIG. 2. Take note of the directions of the hash marks and what the marks symbolize. Note that the first addressed sensor is present and its switch is closed. At the second address, the sensor is present, but the switch is open. At the third address, the sensor is not present. At the fourth address, the sensor is present, but the switch contact is opened. While at the fifth address, the sensor is present and the switch is closed.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. A smart sensor multiplex system for monitoring the status of a plurality of individual switches disposed throughout a motor vehicle, each of said switches having one end of a series-resistor sensing element connected to a moving switch element of said switches, said system comprising:
   (a) a power and signal, bi-directional single-wire bus, said bus being routed throughout the vehicle near each of said plurality of switches;
   (b) a plurality of smart switch sensors disposed throughout the vehicle, each of said sensors having means for forming a first connection across the series-resistor sensing element for each of said plurality of switches, and another means for forming a second connection across said bus and a chassis ground of said vehicle, each of said switch sensors having circuits for providing current signals which are placed on said bus, each of said sensor circuits placing a current signal on said bus during a predetermined time slot of a given polling cycle of said sensors, said current signals being indicative of a status of said switch contact of said switch and of said sensor associated with the predetermined time slot;
   (c) a driver and receiver circuit connected single-ended across a chassis ground of the vehicle and a terminating end of said single-wire bus for generating power and voltage signals in the form of an offset square-wave pulse train, said pulse train being driven onto said bus from said driver and receiver circuit, said sensors being connected to said bus so as to receive said pulse train and to use a plurality of "states" of said pulse train to derive power for operation of circuits within said switch sensor so as to receive a voltage signal indicative of a polling of each sensor so that each of said plurality of sensors are addressed in sequence and then allotted individual predetermined time on said bus, the addressing of each sensor and the allotment of time on said bus being performed in a chosen sequential manner, the sequential manner forming the polling cycle of the sensors, the polling of each of said sensors being at a chosen polling cycle rate, said driver and receiver circuit also having means for receiving, interpreting and then converting said current signals sent over said bus by an addressed sensor into voltage signal indicative of the status of said addressed sensor and its associated switch;
   (d) display means for displaying the status of each of said plurality of sensors and said associated switches;
   (e) microcomputer means interconnecting said driver and receiver circuit and said display means for writing voltage and clock signals to said driver and receiver circuit that controls the generation of the offset square wave pulse train including the plurality of "states", for reading voltage signals from said driver and receiver circuit indicative of the status of each of said addressed sensor and its associated switch, for establishing a history of performance of each of said addressed sensor and of said bus during each polling cycle of said sensors and for transferring updated independent sensor and switch data indicative of the status of said sensors and said switches to said display means during each polling cycle.

2. Apparatus in accordance with claim 1 wherein said offset square wave has at least five "states" including a first "state" from zero volt and rising to a first chosen voltage level below a threshold voltage level, a second "state" from said first chosen voltage level to a second chosen voltage level above said threshold voltage, a third "state" from said second chosen voltage level rising to a maximum crest voltage level, a fourth state descending from said maximum crest voltage level to a third chosen voltage level which is above said threshold voltage, but which occurs during a negative half cycle of said pulse train and a fifth "state" from said third voltage level to said first voltage level which is a voltage below the threshold voltage.

3. Apparatus in accordance with claim 2 wherein after an initial cycle of said pulse, each succeeding pulse excludes the first "state" providing second, third, fourth and fifth "states" of each pulse with the last cycle being an exception, said last cycle having a first state at the trailing end of a negative half cycle.

4. Apparatus in accordance with claim 3 wherein each of said plurality of switch sensors has a voltage supply means receptive to said second "state" of said pulse train which provides power to circuits on each of said plurality of switch sensors.

5. Apparatus in accordance with claim 4 wherein each of said plurality of switch sensors has a clock and overthreshold generator, a reset generator, a constant current source and an address circuit, wherein each of said reset generator is responsive to voltage from said bus as well as to voltage from said voltage supply means, said reset generator supplying a reset signal to a 5-bit counter in said address circuit when an output voltage from said voltage supply means rises to a voltage just below a chosen voltage level at about zero volt, the resetting of the 5-bit counters occurring during a voltage start-up of each of said plurality of switch sensors during said second "state" of said pulse train at the beginning of a new polling cycle.

6. Apparatus in accordance with claim 5 wherein said clock and overthreshold generator provides a clock signal to said 5-bit counter of said address circuit during each of said third "state" which clocks said counter up one binary sequence, said 5-bit counter in each of said plurality of switch sensors being simultaneously clocked, wherein an address detector is associated with said 5-bit counter, wherein each of said plurality of switch sensors includes an address detector pre-programmed to receive a unique binary count, and wherein the preprogramming causes each of said address detectors to be sequentially enabled and to provide an address signal, said address signal being used to designate a chosen switch sensor from said plurality of switch sensors as being addressed, said address signal being used along with an overthreshold signal to generate a "$\overline{SINK}$" signal within said addressed switch sensor, and said $\overline{SINK}$ signal being used to enable said constant current generator in said addressed sensor so as to place current signals on said bus during a clocked cycle.

7. Apparatus in accordance with claim 6 wherein said driver and receiver circuits also receives current signals from said addressed switch sensor, wherein during a four "state" while the voltage is above said threshold voltage, said driver and receiver circuit is receiving current signals indicative of the status of said sensor and wherein during a fifth "state" while the voltage is below said threshold voltage, said driver and receiver circuit is receiving current signals indicative of the state of the switch associated with said addressed sensor.

8. Apparatus in accordance with claim 1 wherein said driver and receiver circuit includes a first comparator means for determining sensor loads and a second comparator means for determining overload conditions on said bus.

9. Apparatus in accordance with claim 1 wherein said driver and receiver circuit includes an analog to digital converter means for use with said bus when the number of said switch sensors connected to said bus is apriori.

10. Apparatus in accordance with claim 7 wherein integrating means within said microcomputer is provided to ensure that the status voltage readings are substantially free of interfering signals.

* * * * *